US006367316B1

(12) United States Patent
Eckerle et al.

(10) Patent No.: US 6,367,316 B1
(45) Date of Patent: Apr. 9, 2002

(54) REAL-TIME MASS FLOW MEASUREMENT

(75) Inventors: Wayne A. Eckerle, Columbus; Hemi Sagi, Carmel; Kyle L. Edwards, Franklin; Norman H. Goris, Nashville, all of IN (US)

(73) Assignee: Cummins Engine Company, Inc., Columbus, IN (US)

(*) Notice: Subject to any disclaimer, the term of this patent is extended or adjusted under 35 U.S.C. 154(b) by 0 days.

(21) Appl. No.: 09/058,869

(22) Filed: Apr. 13, 1998

(51) Int. Cl.[7] .......................... G01M 15/00; G01M 19/00
(52) U.S. Cl. .......................................... 73/113; 73/118.1
(58) Field of Search ................................ 73/116, 119 A, 73/113, 114, 118.1

(56) References Cited

U.S. PATENT DOCUMENTS

| | | | |
|---|---|---|---|
| 1,710,044 A | 4/1929 | Canoose | |
| 3,125,881 A | 3/1964 | Peters et al. | |
| 3,835,700 A | 9/1974 | Gamble | |
| 4,088,012 A | 5/1978 | Emerson | |
| 4,141,243 A | 2/1979 | Van Tassel et al. | |
| 4,171,638 A | * 10/1979 | Coman et al. | 73/119 A |
| 4,426,981 A | 1/1984 | Greiner et al. | |
| 4,453,403 A | 6/1984 | Bussey et al. | |
| 4,461,169 A | 7/1984 | Augustin | |
| 4,503,820 A | 3/1985 | Nakagawa | |
| 4,714,998 A | * 12/1987 | Bussey et al. | 73/119 A |
| 4,718,443 A | 1/1988 | Adney et al. | |
| 4,858,466 A | 8/1989 | Takahashi et al. | |
| 5,000,043 A | 3/1991 | Bunch, Jr. et al. | |
| 5,020,362 A | 6/1991 | Hart et al. | |
| 5,553,490 A | 9/1996 | Nicholls et al. | |

FOREIGN PATENT DOCUMENTS

| | | |
|---|---|---|
| GB | 1 402 876 | 8/1975 |

* cited by examiner

*Primary Examiner*—Benjamin R. Fuller
*Assistant Examiner*—Maurice Stevens
(74) *Attorney, Agent, or Firm*—Nixon Peabody LLP; Charles M. Leedom, Jr.; Daniel Song

(57) ABSTRACT

A real-time mass flow measurement system that accurately measures fuel mass delivered to each cylinder per stroke of an injection pump or a fuel injector in an internal combustion engine. In accordance with preferred embodiment of the present invention, the mass flow measurement system and method includes a fuel measuring device that measures fuel delivered by one of the plurality of fuel injectors or fuel pumps. The preferred embodiment also includes a fuel transfer circuit for directing fuel flow to the fuel measuring device and a plurality of fuel diverting devices positioned along the fuel transfer circuit for diverting fuel flow from the plurality of fuel injectors or pumps into the fuel transfer circuit and a fuel routing device positioned along the fuel transfer circuit for routing the diverted fuel flow to either the fuel measuring device or a fuel drain. The mass flow measurement system further includes a data acquisition system including a digital computer and a flow controller for controlling the fuel routing device. The digital computer includes a software program for receiving operator input data, controlling the fuel diverting devices and obtaining measurement data from the precision bore cylinder. The flow controller includes discrete logic components for generating signals to control the fuel routing valve thereby providing consistent timing control.

71 Claims, 10 Drawing Sheets

REAL-TIME MASS FLOW MEASUREMENT

BACKGROUND OF THE INVENTION

1. Field of the Invention

The present invention is related to the field of liquid measurement systems. More specifically, the invention relates to a real-time mass flow measurement system that measures fuel mass delivered per stroke of an injection pump or a fuel injector.

2. Description of Related Art

Accurate measuring capabilities of flow measurement systems have become very important in the automotive industries where increasingly demanding emission and fuel economy regulations require strict control of the amount of fuel delivered to the engine cylinders from, for example, injection pumps and fuel injectors. For example, because of these increasingly demanding emissions and fuel economy regulations, the metering capabilities of the modern fuel injection systems in diesel engines have improved significantly and recent fuel injection systems deliver fuel to each cylinder with a maximum volume variation of 1–2%. Due to this narrow tolerance, the measurement systems must be capable of measuring fuel delivery with an accuracy of 0.2–0.4% to provide reliable and meaningful information regarding the amount of fuel injected. To provide flexibility and additional utility, these measurement systems should also be able to measure both the average amount of fuel delivered, and the amount delivered in a single stroke ("shot") or multiple strokes of a fuel injector or injection pump plunger or piston.

Of course, various flow measurement systems are generally known in the art and a number of measurement systems have been developed for measuring fuel delivered to internal combustion engines. Many of the simple systems require volumetric measurement of the fluid which is sensitive to fluid expansion and contraction caused by temperature variations. Therefore, these volumetrically based measurement systems are generally not sufficiently accurate enough to be used to precisely monitor the amount of fuel delivered by a fuel injector or an injection pump.

Other measurement systems measure mass flow by using a precision balance to measure mass of the fluid. Although these systems provide accurate measurements with minimal sensitivity to temperature, these balance systems are time consuming to use and sensitive to environmental vibrations. Therefore, these precision balance systems are not easily adaptable to industrial environments such as manufacturing facilities where engines are assembled and tested for proper operation.

Another type of mass flow measurement system uses a precision bore tube and a pressure transducer to obtain accurate mass measurements of the fluid. An example of such a mass flow measurement system is shown in U.S. Pat. No. 3,835,700 to Gamble which discloses a fuel meter system that continuously measures the total flow to the engine by using a precision bore tube and a pressure transducer to measure the pressure of the column height to establish the mass flow of the liquid. One limitation of Gamble's system is that it only provides an average fueling measurement to the engine and does not provide any means to accurately measure the mass flow provided to each cylinder of a multi-cylinder engine.

U.S. Pat. No. 4,088,012 to Emerson discloses a fuel injection metering system wherein the engine fuel injection system is connected to a metering apparatus comprising transparent graduates. Each engine cylinder is provided with a corresponding transparent graduate which captures the fuel delivered by the injector. Emerson's system, however, is a very simple system that requires visual readings of the fuel level in the respective graduates which is highly inaccurate and will not provide the degree of accuracy required to test modern fuel systems.

U.S. Pat. No. 4,171,638 to Coman discloses another system for measuring pulsating fluid flow wherein the discharged fluid is collected in a container for a predetermined number of flow pulses, the volume or the weight of the fuel is measured by a transducer, and the data processed to determine the amount of fluid collected for a predetermined number of fluid flow pulses. The '638 patent, however, discloses a measurement system applicable for a single cylinder fuel pump and does not address the special problems encountered in measuring the mass flow provided to each cylinder of a multi-cylinder engine.

Significant difficulties arise when trying to accurately measure the mass flow provided to each cylinder of a multi-cylinder engine. Because there are multiple number of injector pumps or fuel injectors, the mass measurement event must be synchronized to the timing of the engine. In addition, the system must also be flexible enough to allow the operator to designate the injector pump or fuel injector to be measured and the number of shots measured.

Modern measurement systems have attempted to obtain such capabilities by using microprocessor based digital computers with data acquisition software programs. The use of computers and data acquisition software allowed the measurement system to measure the fuel injected by a designated injector and allowed system flexibility and friendly user interface. An example of such a system is shown in U.S. Pat. Nos. 4,453,403 and 4,714,998, both to Bussey et al. These references disclose volumetric metering equipment for a fuel injection system that uses a microcomputer to monitor and record the total volume of fuel collected and the time when each fuel injector is injecting. The system then uses the recorded data to calculate the volume of fuel collected during the time when a particular injector was injecting, thereby indirectly determining the volume of fluid injected by each injector of the multi-injector system.

However, such systems that combine fluids injected by numerous injectors and use computer software to calculate the contributions of each injector were found to be inaccurate for various reasons. The primary reason for the inaccuracy is that there is no assurance in accurately timing the injection event to the measurement data acquired for a particular injector. In theory, the computer and the data acquisition software should respond instantaneously to operate any valves needed to collect the injected fuel and record the volume of fluid collected at the precise time of the injection event. In practice, however, the inventors of the present invention found that because computers use interrupt signals through a common bus to process the data acquisition software codes, data signals and control signals, the timing of the controls for fluid collection was inconsistent. Because of the inconsistency in the time needed to process any given signal and software code, it was found that a system based on data acquisition software cannot provide consistent performance in timing the fluid collection. Thus, there was no assurance that all of the fuel injected by the designated injector is measured and recorded. In addition, these software controlled systems do not provide assurance that only full shots are collected and that the measurement in fact terminated at the end of the predetermined number of injection events. Furthermore, because the injected fluids of the numerous injectors were combined and collected together, the timing errors during the injection of one injector adversely impacted the measurements and calculations of the other injectors. Thus, it was found that a software based mass flow measurement system can not ensure measurement accuracy and certainty to the degree of precision desired.

Therefore, there exists an unfulfilled need for a mass flow measurement system that can accurately measure the fluid provided to each cylinder of a multi-cylinder internal combustion engine and ensure precise control over the timing of the mass flow measurement system.

SUMMARY OF THE INVENTION

In view of the foregoing, it is an object of the present invention to provide an improved mass flow measurement system that can accurately measure the fluid provided to each cylinder of a multi-cylinder internal combustion engine by a plurality of fuel injectors or fuel pumps.

A second object of the present invention is to provide an improved mass flow measurement system which will allow precise control over the timing of the mass flow measurement so as to synchronize the data acquisition with the pump output so as to ensure measurement accuracy and certainty.

Yet another object of the present invention is to provide a mass flow measurement system which ensures that all of the fuel delivered by a designated pump during a predetermined number of shots is captured and recorded, and at the same time, ensures that only complete shots of the fuel injector, or injection pump, plunger or piston, is captured.

In accordance with one embodiment of the present invention, these objects are obtained by an improved mass flow measurement system including a fuel measuring device with a precision bore cylinder and a pressure transducer at its base that measures fuel delivered by one of the plurality of fuel injectors or fuel pumps. The fuel measuring device also includes a connector tube that maintains fluid over the pressure transducer so as to ensure accuracy in the pressure measurement. This embodiment also includes a fuel transfer circuit for directing fuel flow to the fuel measuring device and a plurality of fuel routing devices positioned along the fuel transfer circuit for routing fuel flow from the plurality of fuel injectors or pumps into the fuel transfer circuit, each of the plurality of fuel routing devices being associated with a respective one of the plurality of fuel injectors or fuel pumps. The mass flow measurement system also includes a fuel diverter positioned along the fuel transfer circuit for diverting the routed fuel flow to either the fuel measuring device or a fuel drain and a output trigger that initiates the measurement event. The mass flow measurement system further includes a data acquisition system including a digital computer and a flow controller for controlling the fuel diverter. The digital computer includes a software program for receiving operator input data, controlling the fuel routing devices and obtaining measurement data from the fuel measuring device. The flow controller includes discrete logic components for controlling the fuel diverter thereby providing consistent timing control. A pump position sensor is also provided to allow the determination of the number of shots collected and to allow a delay time which ensures that only full shots are captured.

Also in accordance with the present invention, these objects are obtained by a method for measuring a quantity of fuel delivered by a fuel pump in a fuel system including a plurality of fuel pumps. The method includes the steps of providing a fuel measuring device for measuring fuel delivered by the fuel pump, providing a fuel transfer circuit for transferring fuel flow from the plurality of fuel pumps to the fuel measuring device, routing the fuel flow from the fuel pump into the fuel transfer circuit and diverting the routed fuel flow to either the fuel measuring device or the fuel drain. The method also includes the steps of receiving operator input data, initiating the measurement process by a trigger signal, and providing a flow controller with discrete logic components to control the fuel diverter. The method further includes the steps of providing encoder pulses which corresponds to the rotational position of the fuel pump to the flow controller, counting the encoder pulses to determine the number of shots collected and the delay time, and operating the diverter valve to divert the routed fuel flow to the fuel drain. The method also includes the steps of obtaining data from the fuel measuring device and calculating the corresponding volume of the fuel collected.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENTS

Figure 1:
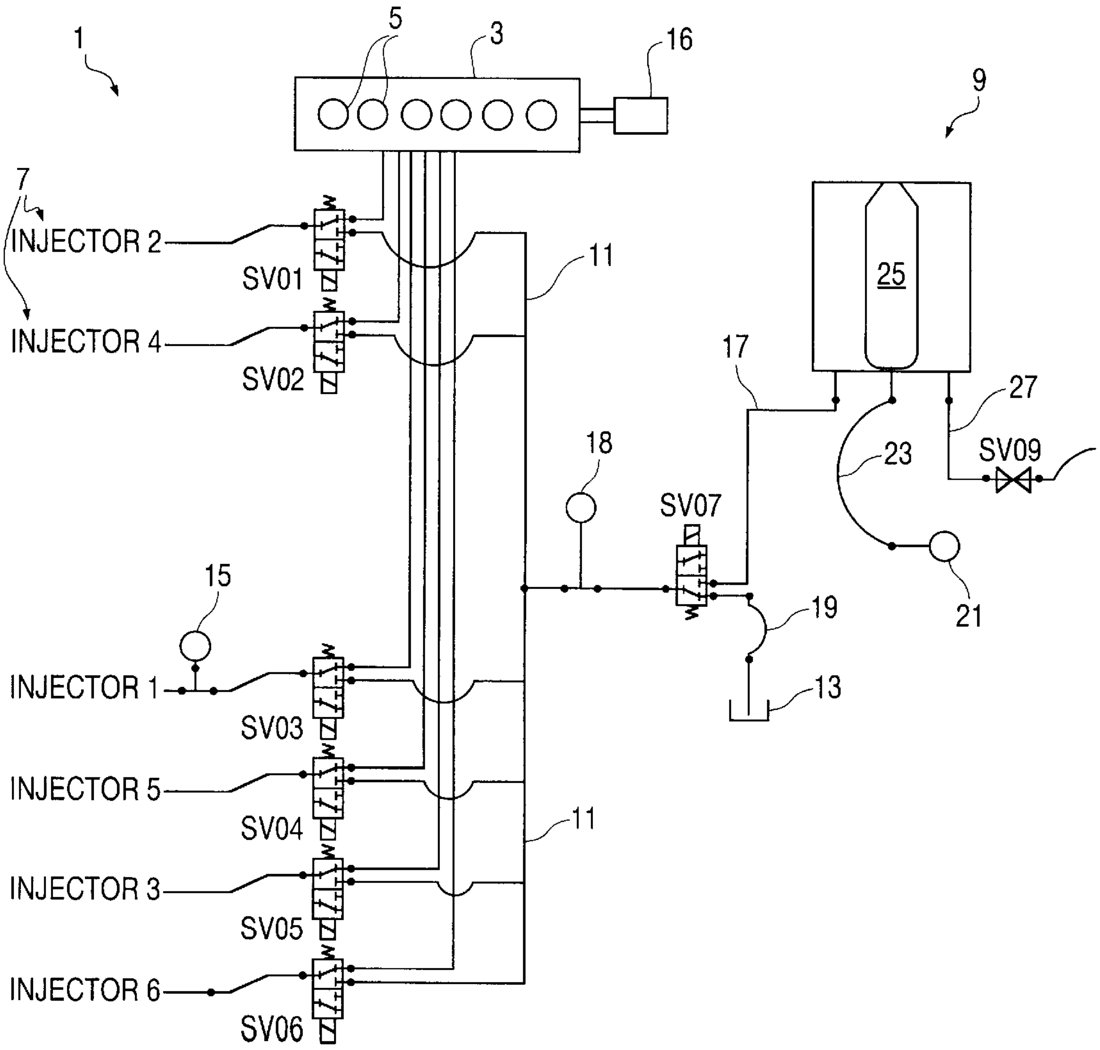
FIG. 1 is a schematic view of a mass flow measurement system in accordance with the present invention.

FIG. 1 illustrates a mass flow measurement system 1 in accordance with one embodiment of the present invention that measures a fuel mass intended to be delivered to a cylinder 5 by a fuel pump or a fuel injector in a multi-cylinder engine 3. Although the mass flow measurement system 1 discussed hereinbelow is specifically designed for use with an internal combustion engine 3 having six cylinders 5, and thus six respective fuel injectors 7, the present invention may be applied to engines with any number of cylinders and/or injectors. Furthermore, although the embodiment of the mass flow measurement system 1 as discussed hereinbelow is designed to measure fuel injected by fuel injectors, the present invention is equally applicable to measuring the output of any pump or pump systems including fuel pumps, e.g. an in-line fuel injector pump.

The mass flow measurement system 1 includes a fuel transfer circuit 11 for directing the fuel flow from the six fuel injectors 7 to the fuel measuring device 9. Six fuel routing devices SV01–SV06 are positioned along the fuel transfer circuit 11 and are operable to route fuel flowing to the cylinders 5 of the engine 3 from the six fuel injectors 7, into the fuel transfer circuit 11. Each of the six fuel routing devices SV01–SV06 are associated with a respective one of the six fuel injectors 7. Thus, as clearly indicated in FIG. 1, SV01 is associated with Injector 2, SV02 is associated with Injector 4, SV03 is associated with Injector 1, etc. For example, in normal operation, the fuel injected by Injector 2 is delivered to a respective cylinder in the engine 3. However, when SV01 is operated, the fuel injected by Injector 2 is delivered into the fuel transfer circuit 11. Although in the embodiment discussed, three-way solenoid valves may be used for the six fuel routing devices SV01–SV06, other fluid routing devices may also be used effectively.

The mass flow measurement system 1 also includes an output trigger 15 in an injector fuel line which provides a trigger signal when an injector event occurs. The output trigger 15 begins (or "triggers") the measurement event. In the present configuration of FIG. 1, the output trigger 15 is provided in the injector fuel line for Injector 1, thus providing a trigger signal corresponding to the output of Injector 1. However, the output trigger 15 may be provided in the fuel line of another injector or even more than one injector fuel lines. A pressure transducer is very suitable to be used as the output trigger 15 but any other appropriate triggering devices may also be used to indicate injector output.

A temperature sensor 18 and a fuel diverter SV07 is positioned along the fuel transfer circuit 11 downstream of the six fuel routing devices SV01–SV06. The temperature sensor 18 measures the temperature of the fuel being collected in the fuel measuring device 9 and allows the determination of the volume of fuel as discussed below. The fuel diverting SV07 diverts the fuel flow from the six fuel routing devices SV01–SV06 to either the fuel measuring device 9 through a fuel fill line 17, or to a fuel drain 13 through a fuel drain line 19. A three-way solenoid valve with a response time between 12–15 millisecond can be used for the fuel diverter SV07, however, other fluid diverting devices with comparable response time may also be used.

Figure 2:
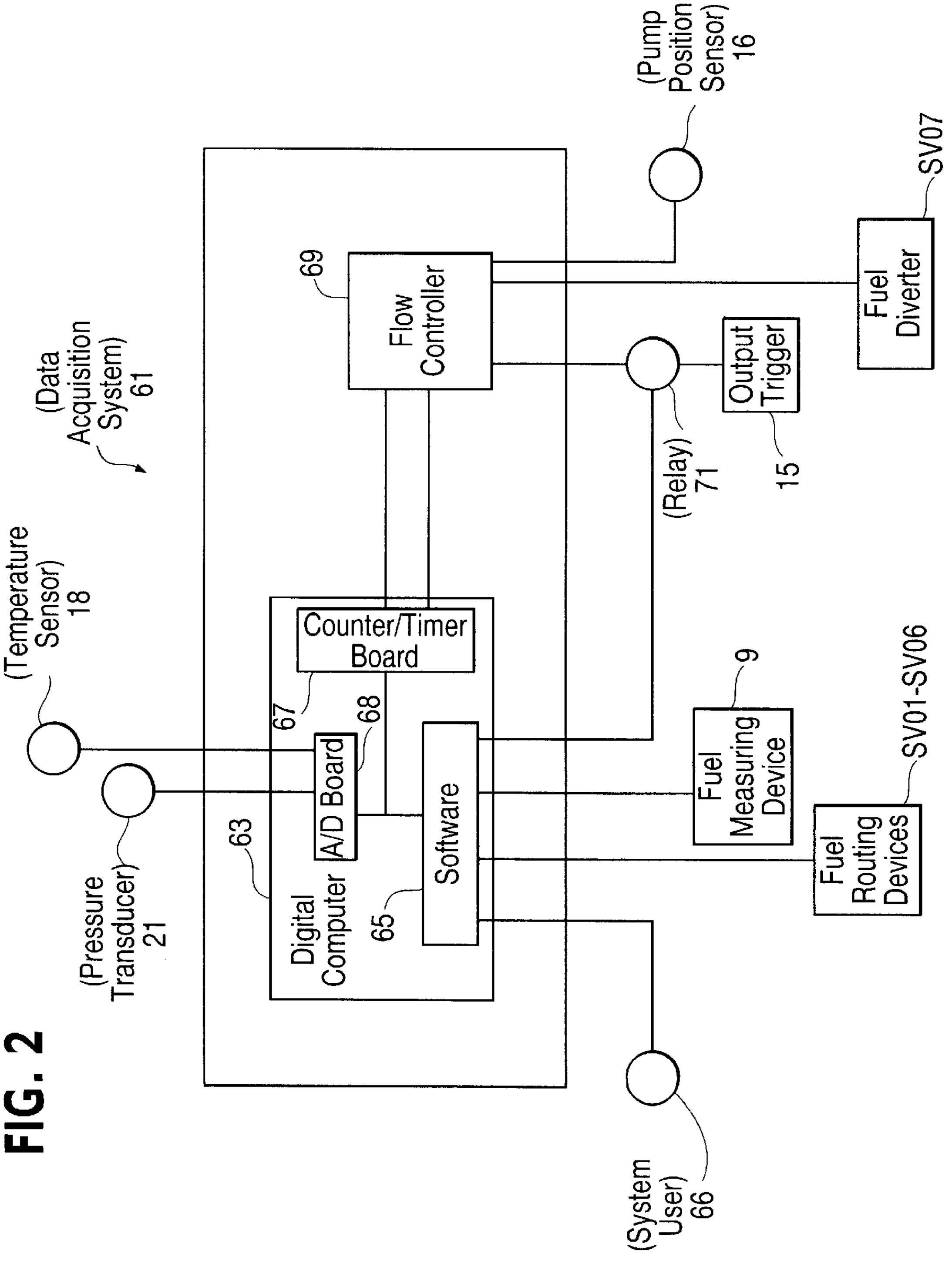
FIG. 2 is a block diagram of a data acquisition system for a mass flow measurement system in accordance with the present invention.

Unlike measurement systems of the prior art, the duration of the measurement and the operation of the fuel diverter SV07 in the present invention is hardware based rather than software based. In this regard, the present measurement system further includes a data acquisition system (shown in FIG. 2 and discussed below) which includes discrete logic components that control timing and the operation of the fuel diverter SV07 thereby providing consistent timing control. As previously discussed, this hardware based approach eliminates the inconsistent time delays which can occur in software based systems.

The present invention also includes a pump position sensor 16 which provides encoder pulses of predetermined pulses per revolution of the pump. A pump position sensor 16 providing 3600 pulses per revolution has been found to be suitable in providing the encoder pulses in the present embodiment. The mass flow measurement system 1 monitors and uses the encoder pulses and the known engine firing order to precisely synchronize the beginning and the end of the measurement event with the beginning and the end of injection event for any given cylinder 5. In addition, to further enhance the accuracy of the mass flow measurement system 1, the present invention ensures that only full injector shots are collected in the fuel measuring device 9 by providing a predetermined delay time which compensates for pump speed, injector firing order, and the response times of the fuel diverter SV07. This delay time can be implemented by delaying the operation of the fuel diverter SV07 for a predetermined number of encoder pulses from the pump position sensor 16.

The fuel measuring device 9, which collects and measures the fuel intended for delivery to a cylinder by an injector, includes a pressure transducer 21 fluidically connected via a transducer line 23 to a collection tube 25. The pressure transducer 21 senses the quantity of fuel collected in the collection tube 25 which collects fuel delivered to a cylinder by a fuel injector. The pressure transducer 21 measures the pressure differential ("Delta P") utilizing the "capacity change" method known in the art. A pressure transducer with a measurement range of 0–10 inches of water has been found to be suitable in this application although other transducers or other pressure transducers with differing ranges may also be suitable. The fuel measuring device 9 also includes a drain valve SV09 fluidly connected to the collection tube 25 via a tube drain line 27 to allow the draining of the fuel collected in the collection tube 25.

Figure 3:
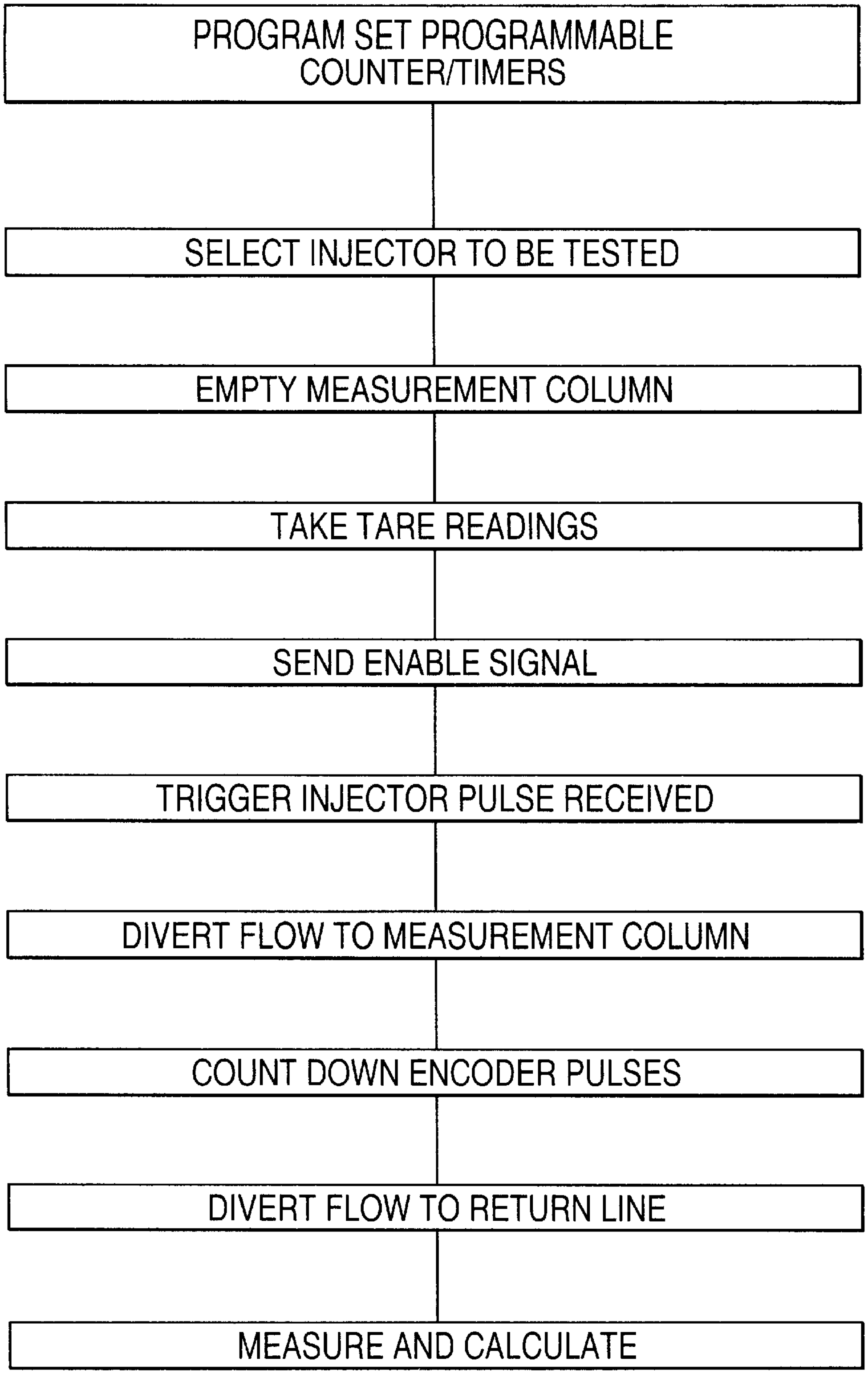
FIG. 3 is a block diagram of the test sequence for a mass flow measurement system in accordance with one embodiment of the present invention.

FIG. 3 is a block diagram illustrative of a data acquisition system 61 for controlling the mass flow measurement system 1 in accordance with the present invention. The data acquisition system 61 includes a digital computer 63 with a data acquisition software program 65, a counter/timer board 67, and an A/D board 68 electrically/electronically connected to the various components as indicated.

The software program 65 allows a system user 66 to input relevant input data such as designating which injector to test, designating the number of shots to be collected and the appropriate delay time based on the number of encoder pulses. The software program 65 operates one of the fuel routing devices SV01–SV06 that corresponds to the injector designated to be tested by the system user 66. The software program 65 also programs into the counter/timer board 67, the number of shots to be collected and the appropriate delay time as inputted by the system user 66. As previously noted, the delay time compensates for pump speed, injector firing order, and response time of SV07 thereby ensuring that only full shots are captured in the fuel measuring device 9.

In addition, the software program 65 also receives digitized signals from the A/D board 68 which are indicative of the pressure differential Delta P and the fuel temperature. The A/D board 68 may be a 16-bit analog-digital board known in the computer arts. The A/D board 68 receives the analog signals from the pressure transducer 21 and the temperature sensor 18 and converts these analog signals into digital signals such that they may be used by the digital computer 63 through the software program 65. The mass of the collected fuel is determined by comparing the Delta P to data stored in a calibration look-up table in the computer software 65 and/or computer 63 which correlates the value of Delta P to fuel mass. The volume of fuel delivered for a standard temperature can also be calculated by using the measured temperature value and the known density properties of the fuel. These values are calculated and recorded by the software program 65. The software program 65 also operates a relay switch 71 which enables a flow controller 69 discussed below and establishes an electrical connection between the flow controller 69 and the output trigger 15.

As previously noted, the duration of the measurement and the operation of the fuel diverter SV07 in the present invention is hardware based rather than software based. To eliminate the inconsistent time delays which can occur in software based systems, the data acquisition system 61 includes a flow controller 69 which includes discrete logic components that generate signals to control the fuel diverter SV07. The flow controller 69 is electrically connected to the counter/timer board 67, the fuel diverter SV07, the pump position sensor 16 and to a relay switch 71. The relay switch 71 which is operated by the software program 65, electrically connects the output trigger 15 to the flow controller 69.

Because the flow controller 69 uses discrete logic components to control the fuel routing device SV07, the flow controller 69 provides consistent timing control of the fuel routing device SV07 without the timing inconsistencies of software controlled systems which use interrupt signals through a common bus to process data acquisition software codes, data signals and control signals. The data acquisition system 61 monitors and uses the encoder pulses to precisely time the beginning and the end of the measurement event. Also unlike measurement systems known in the art which commonly measure pressure pulses to determine the number of shots collected, the present invention determines the number of shots actually collected based on the number of encoder pulses from the pump position sensor 16. Also as previously noted, the present invention ensures that only full injector shots are collected by delaying the operation of the fuel diverter SV07 for a predetermined number of encoder pulses from the pump position sensor 16.

In operation, before the start of the mass flow measurement process, a user 66 uses the data acquisition software program 65 to input the speed of the engine, designate the injector to be tested, the number of shots to be collected, and a delay time as determined by the number of encoder pulses required to ensure only full shots are captured. When these inputs are complete and the appropriate command is given, the software program 65 programs into the counter/timer board 67, the number of shots to be collected, and the predetermined delay time as inputted by the system user 66. The software program 65 then controls the corresponding fuel routing device (one of SV01–SV06) to route the flow from the designated injector to the fuel transfer circuit 11. For example, if the user 66 inputs into the software program 65 that Injector 1 is to be tested, the software program 65 will direct SV03 to route the fuel injected by Injector 1 to the fuel transfer circuit 11. Because the fuel diverter device SV07 is in the default position, the routed fuel is diverted to the fuel drain 13 through the fuel drain line 19.

Also at this time, the software program 65 operates the relay switch 71 which enables the flow controller 69 and establishes an electrical connection between the flow controller 69 and the output trigger 15. The established electrical connection allows the flow controller 69 to receive a trigger signal from the output trigger 15. When the flow controller 69 is enabled, an amplifier (not shown) on the flow controller 69 latches a pin location high. The pin is monitored by an AND gate (not shown) on the flow controller 69 which controls the operation of the fuel diverter SV07.

When the trigger signal is sent by the output trigger 15 upon detection of an injection event as determined by a pressure increase, the trigger signal is received by a comparator circuit on the flow controller 69 and an amplifier in the flow controller 69 sends a count signal to the programmable counter/timer board 67 on the computer which has been programmed by the software program 65 with the number of shots to be collected and the delay time. Upon receipt of the count signal, the counter/timer board 67 waits for the predetermined delay time and sends a switch signal to the AND gate on the flow controller 69. When both the enabled signal from the amplifier (not shown) and the switch signal from the counter/timer board 67 is received by the AND gate, the AND gate switches the fuel diverting device SV07 to divert the fuel flow from the fuel transfer circuit 11 to the fuel measuring device 9 thereby capturing the flow from the designated injector.

The counter/timer board 67 counts the encoder pulses received and compares the count value to the predetermined count value as provided by the software program 65 which is based on the number of shots to be collected as inputted by the system user 66. When the count value corresponds to the predetermined count value, the counter/timer board 67 waits for additional predetermined encoder pulses which correspond to the delay time and then terminates the switch signal to the AND gate on the flow controller 69. As previously noted, this delay time ensures that only full shots are collected in the fuel measuring device 9. The termination of the switch signal to the AND gate causes the AND gate to switch the fuel diverting device SV07 to the default position which diverts the fuel flow to the fuel drain 13. The flow controller 69 is then disabled and the mass flow measurement data in the fuel measuring device 9 is obtained by the software program 65.

The counter/timer board 67 may also include two counters, one counting up and the other counting down and require that the two counters match before terminating the switch signal to the AND gate. If counters agree, the counter/timer board 67 may also send a signal to the software that the measurement is complete. If the counters do not agree, the counter/timer board 67 may send an error message to the software, and the measurement can be repeated.

Figure 4:
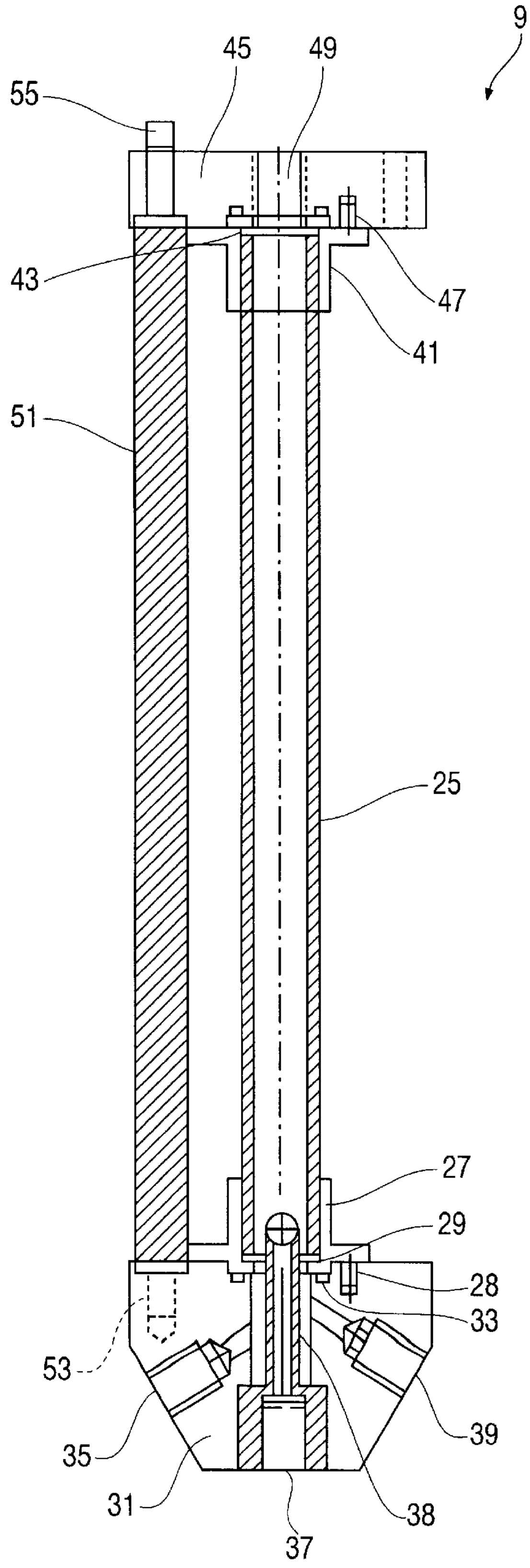
FIG. 4 is a detailed view of the precision bore cylinder for collecting fuel in accordance with one embodiment of the present invention.

The software program 65 monitors and records the Delta P as measured by the pressure transducer 21 and calculates the corresponding volume of fuel delivered for a standard temperature value since the actual fuel temperature is measured by temperature sensor 18 and the density properties of the fuel are known. The software program 65 may also measure and record the fuel in the collection tube 25 before starting the mass flow measurement process. This measurement can be used to calibrate the transducer 21 to compensate for any fuel present in the collection tube 25 before the start of fuel collection thereby further ensuring an accurate measurement of the fuel collected. In addition, the software program 65 may also calculate the amount of fuel added per shot since the number of shots collected is known. FIG. 4 is provided to generally illustrate the operational sequence of one embodiment of the present invention.

Various fluid measuring devices may be used for the fuel measuring device 9 shown in FIG. 1 of the present invention. The one embodiment of the fuel measuring device 9 in accordance with the present invention is shown in detail in FIG. 4. The fuel measuring device 9 includes the collection tube 25 of a predetermined diameter and length. Because precise dimensioning of the collection tube 25 is critical to accurate measurement, the collection tube 25 may be made from precision ground glass tube. The collection tube 25 may also be made from any other material which is chemically inert to the fluid being collected and can be formed to precise dimensions. However, a collection tube made of glass has the distinct advantage of allowing the viewing of the fluid collected. The fuel measuring device 9 also includes collection tubes of various sizes which can be installed to allow the operator to vary the capacity of the mass flow measurement system 1 and allow the system to collect varying number of shots from a designated injector. In addition, the sizing of the collection tubes allows the operator to minimize the measurement effects of fluidic bonding between the inner wall of the collection tube and the fluid being captured.

The lower end of the collection tube 25 of the fuel measuring device 9 is mounted to a bottom bushing 27. The bottom bushing 27 includes a seal 29 for sealing the interface between the collection tube 25 and the bottom bushing 27. The bottom bushing 27 is fixedly mounted by a fastener 28 to a base 31 which also includes a seal 33 for sealing the interface between the bottom bushing 27 and the base 31. The seals 29 and 33 are made from Viton, the bottom bushing 27 is formed from Teflon and the base 31 is fabricated from steel or stainless steel although other appropriate materials may be used for these components. The base 31 includes an inlet port 35 for connecting the fuel fill line 17, a transducer port 37 for connecting the transducer line 23 and a drain port 39 for connecting the tube drain line 27. These ports provide access for filling, measuring and emptying the fuel in the collection tube 25 during the operation of the mass flow measurement system 1. The base 31 further includes a connector tube 38 which fluidically connects the collection tube 25 to the transducer port 37 to ensure that the transducer line 23 stays filled with fluid at all times thereby preventing air bubbles in the transducer line 23 which can cause inaccuracies in the Delta P measured by the transducer 21.

The upper end of the collection tube 25 of the fuel measuring device 9 is mounted to a top bushing 41 which includes a seal 43 for sealing the interface between the collection tube 25 and the top bushing 41. The top bushing 41 is fixedly mounted to a top cap 45 by a fastener 47. The top bushing 41 is formed from Teflon, seal 43 is made of Viton and the top cap 45 is fabricated from steel or stainless steel. However, any other appropriate material may be used for these components. The top cap 45 and the top bushing 43 includes a venting means 49 which opens the collection tube 25 to atmospheric pressure and allows venting of air displaced by the fluid flowing into the collection tube 25 during the operation of the mass flow measurement system 1.

In addition, the base 31 is rigidly connected to the top cap 45 by spacers 51 (only one is shown) which are fastened to the base 31 at one end by a fastener 53 and to the top cap 45 at the other end by another fastener 55. In the present embodiment, three spacers 51 are used to rigidify the fuel measuring means 9 and to support and protect the collection tube 25. This support and protection is especially important in the case where the collection tube 25 is made from precision ground glass which may be fragile in comparison to collection tubes made from other materials such as aluminum. The spacers 51 are made of aluminum in the present embodiment but may be made of any other substantially rigid material.

The fuel measuring device 9 as illustrated in FIG. 4 and described above, is mounted vertically in a test stand with the top cap 45 at a higher elevation than the base 31. Because the base 31 includes an inlet port 35 for connecting a fuel fill line 17, the collection tube 25 is filled from the bottom. This bottom filling allows the mass flow measurement system 1 to be more responsive since the system need not wait for the fluid to settle to the bottom of the collection tube before determining Delta P as would be required if the collection tube was filled from the top.

In one embodiment of the flow controller 69, the flow controller 69 includes a flow controller circuit, a pressure comparison board, a pulse stretcher board, and a timer interrupt board. In this regard, FIG. 5A through FIG. 9 provide specific schematic diagrams of the various electronic and electrical circuits which can be used in the present embodiment of the flow controller 69. The details of the operational sequence of these various electronic and electrical circuits are discussed below using terminology known in the electrical arts to provide an example of one embodiment of the flow controller 69. However, because various different circuits and control mechanisms may also be used, it should be clear that the flow controller 69 in accordance with the present invention is not limited to the specific embodiment discussed below.

Figure 5A:
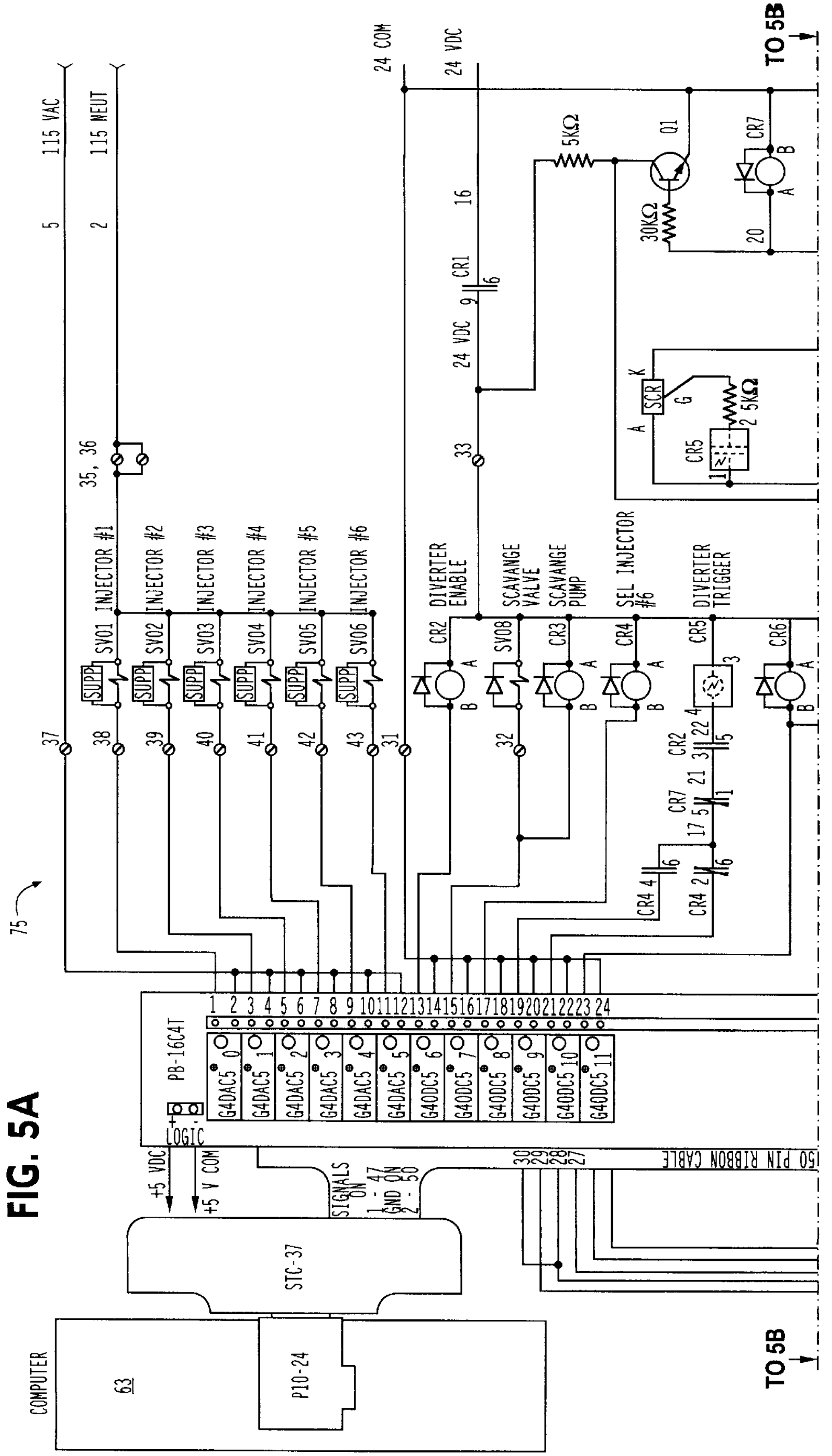
FIGS. 5A and 5B together show an electrical schematic diagram of a flow controller circuit in one embodiment of the flow controller in accordance with the present invention.
Figure 5B:
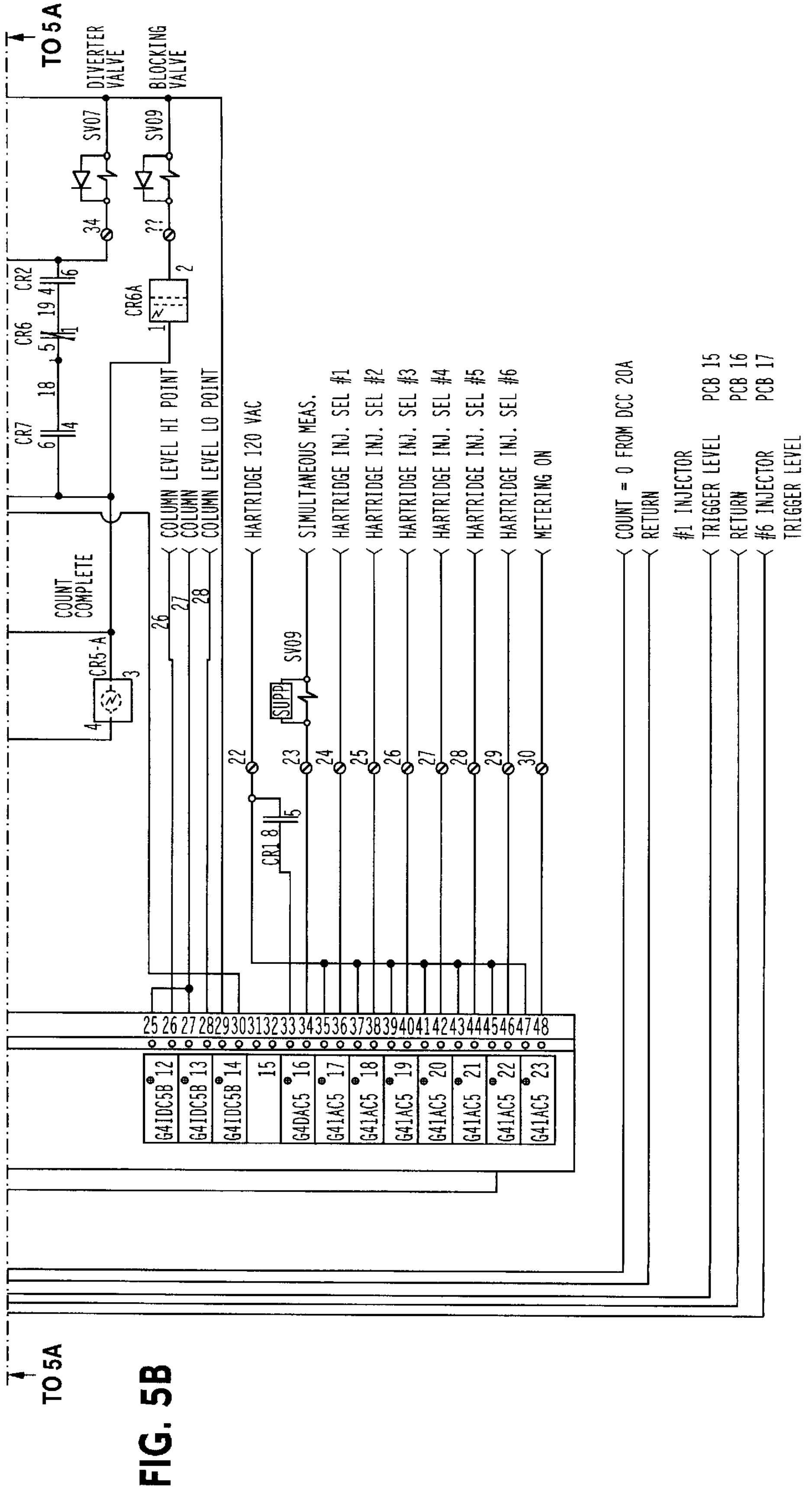
Figures 6A, 6B:
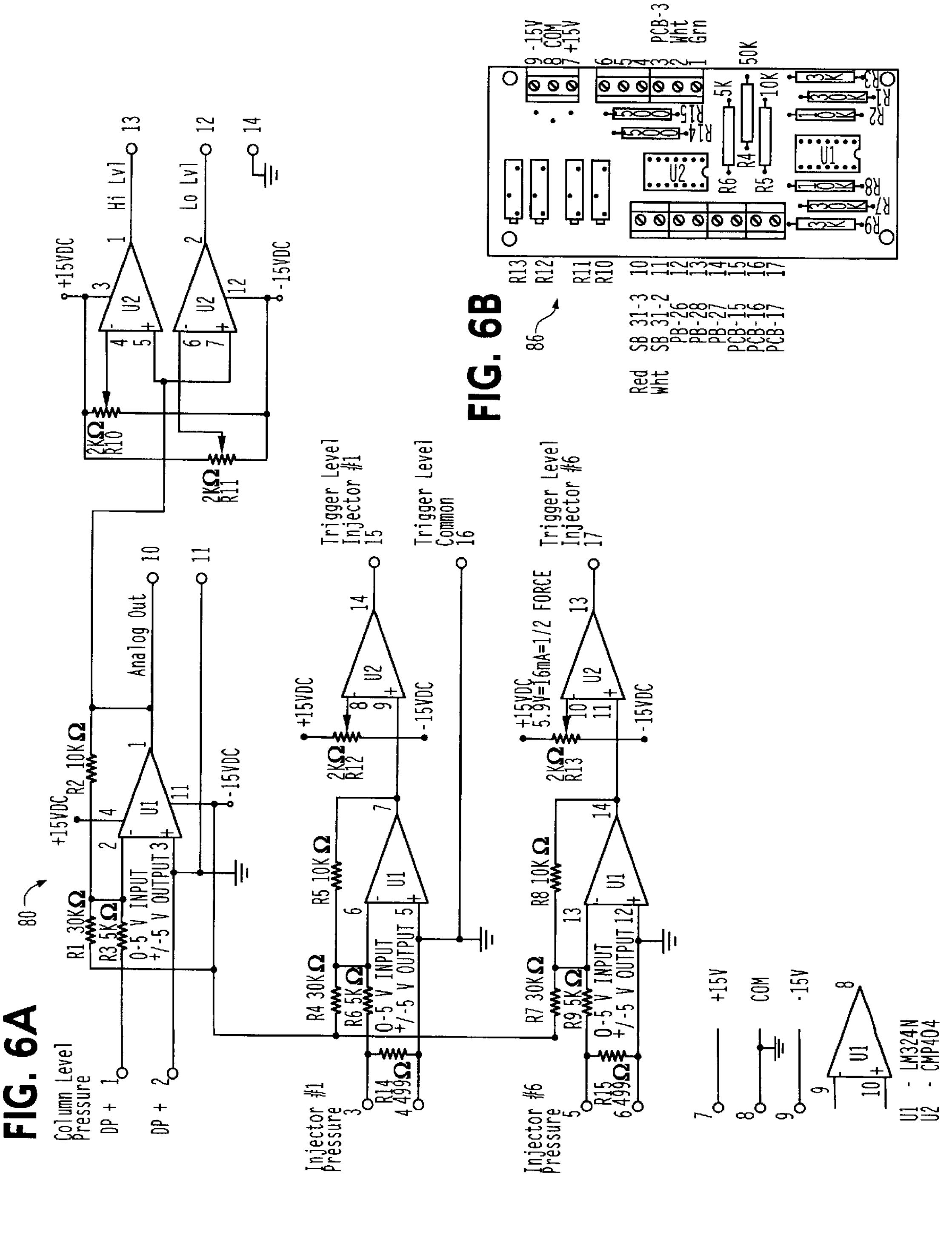
FIG. 6A is an electrical schematic diagram of a pressure comparison circuit in one embodiment of the flow controller in accordance with the present invention.
FIG. 6B is a board layout diagram of a Pressure Comparison Board which includes the pressure comparison circuit shown in FIG. 6A.
Figure 7A:
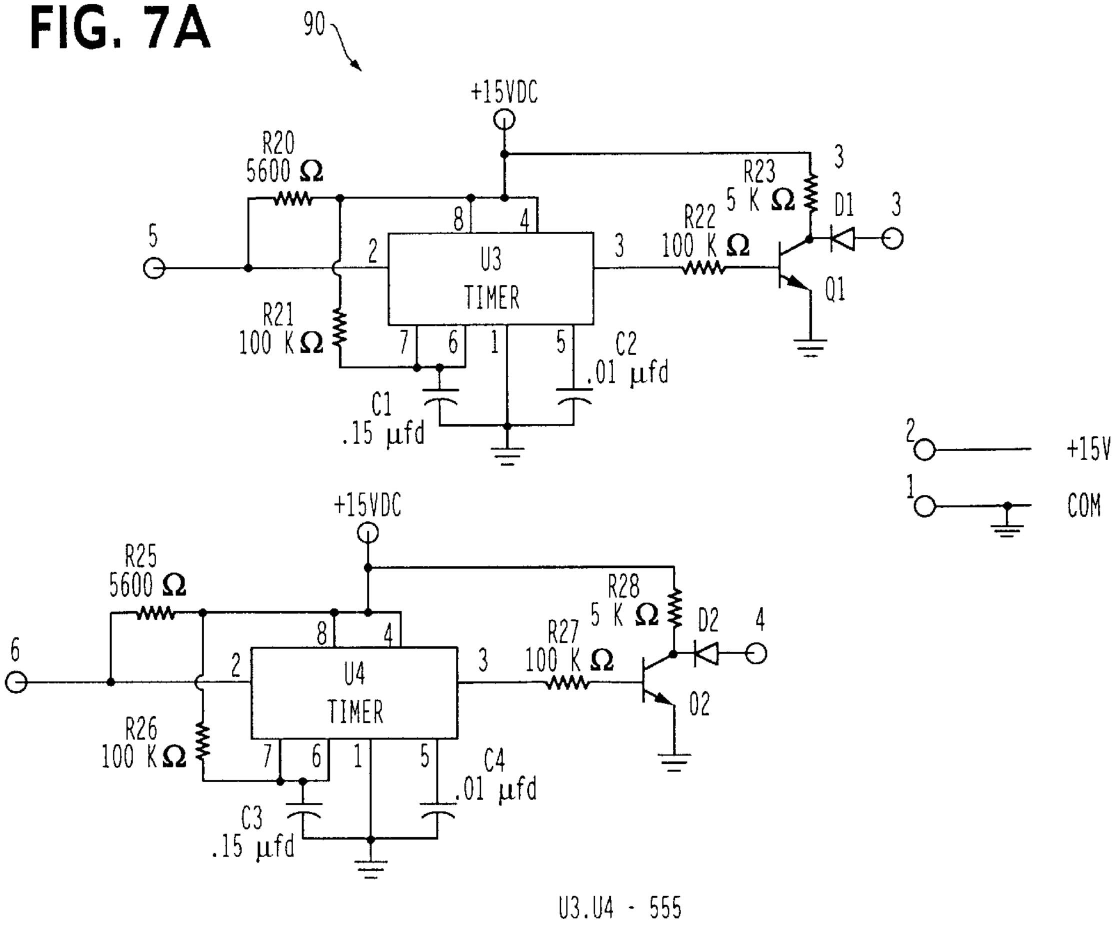
FIG. 7A is an electrical schematic diagram of pulse stretching circuits in one embodiment of the flow controller in accordance with the present invention.
Figure 7B:
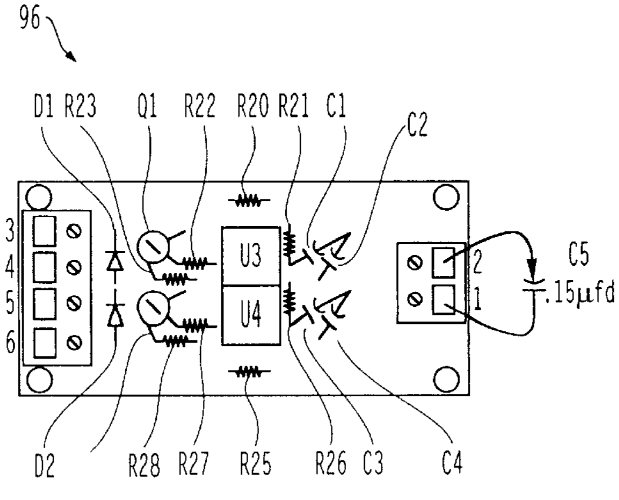
FIG. 7B is a board layout diagram of a Pulse Stretcher Board which includes the pulse stretching circuits shown in FIG. 7A.

More specifically, FIGS. 5A and 5B together show an electrical schematic diagram of a flow controller circuit 75 in the flow controller 69 which is connected to the computer 63 by a PIO interface known in the art. Before the test sequence is initiated, the operational parameters are initially entered into the software 65 including the engine speed, the injector to be tested, the number of shots to be collected, and the delay time as determined by number of encoder pulses. As a condition of starting the mass flow measurement process, an E-Stop (CR1) in the flow controller 69 must be energized. At the start of the measurement process, the measurement system selects the specific injector to be tested by routing the specific injector's flow to the fuel transfer circuit 11 through the operation of one of the fuel routing devices SV01–SV06. Any residual fuel in the collection tube 25 is removed by energizing a scavenge pump (not shown) through the contact relay CR3 until the fuel level is below a set point as determined by a Column Level Lo Point digital input.

Tare readings are taken by the flow measurement system to provide a reference point for calculating the fuel collected in the collection tube 25 in the mass flow measurement process. The contact relay CR2 (Diverter Enable) activates the pressure comparison circuit 80 schematically shown in FIG. 6A as including the discrete logic components U1 and U2. The pressure comparison circuit 80 monitors and detects the trigger signal from the selected output trigger 15 and starts the fuel collection and measurement event independent of computer 63 timing or response constraints.

The output trigger signal from the selected output trigger 15 is conditioned through amplification, squaring and stretching to clean up the signal and ensure that the signal accurately reflects an injection event of an injector. The pressure comparison circuit 80 also performs the amplification and the squaring of the encoder pulses. The layout of the pressure comparison circuit 80 and the discrete logic components U1 and U2 are shown as the Pressure Comparison Board 86 in FIG. 6B. The stretching of the encoder pulsed output is accomplished by pulse stretcher circuits 90 schematically shown in FIG. 7A and includes discrete logic components U3 and U4. The layout of the pulse stretcher circuit 90 and the discrete logic components U3 and U4 are shown as the Pulse Stretcher 96 in FIG. 7B. Of course, the layout shown in the Pressure Comparison Board 86 and the Pulse Stretcher 96 is shown as an example only and alternative layouts may be used in accordance to conventional practices of circuit design.

The above conditioned trigger signal from the output trigger 15 is then provided to inputs marked #1 Injector Trigger Level and to CR4 on the flow controller circuit 75 through a high speed opto-isolation channel provided on channel 9 or 10 of PB-16C4T, all of which is shown in FIGS. 5A and 5B. Then the normally closed CR7 contacts (Diverter On) and the closed contacts of CR2 (Diverter Enable) energize CR5 (Diverter Trigger). It is noted that an output trigger 15 may be provided in two different locations (for example, in the fuel circuits of Injector 1 and Injector 6) and may be automatically selected by the measurement system dependent upon the position of the trigger in angular distance relative to the injector being tested and the pump speed. Thus, in the present embodiment, another trigger was provided in the injector line for Injector 6 and thus, the conditioned output trigger signal from the output trigger 15 may, in the alternative, be provided to #6 Injector Trigger Level depending upon the output trigger selected.

Because CR5 (Diverter Trigger) serves as a gate for SCR which provides the power to energize SV07 (Diverter Valve), the diversion of the fuel injected by the selected injector into the fuel measuring device 9 is accomplished upon receipt of the conditioned trigger signal. The power to operate SV07 comes from the SCR through the normally closed contacts of CR6 (Count Complete) and closed CR2 (Diverter Enable). Simultaneous with the energizing of SV07 (Diverter Valve), CR7 (Diverted) is energized and Q1 sends a "Diverter In" signal to the Diverter In input on the timer interrupt circuit 100 shown in FIG. 8A. The CR5 (Diverter Trigger) in the flow controller circuit 75 of FIGS. 5A and 5B is prevented from operating repeatedly by opening of CR7 which is normally closed (Diverted) contact.

The precise synchronization of the measurement event to the injection event is accomplished by accurately counting the encoder pulses from the pump position sensor 16 and by accurately timing the operation of the diverter SV07. The counting of encoder pulses is started when the "Diverter In" signal is received by the Counter/Timer Board 67. The details of the Counter/Timer Board 67 are omitted since such boards with standard programs and a counter true chip are known in the art.

Figure 8A:
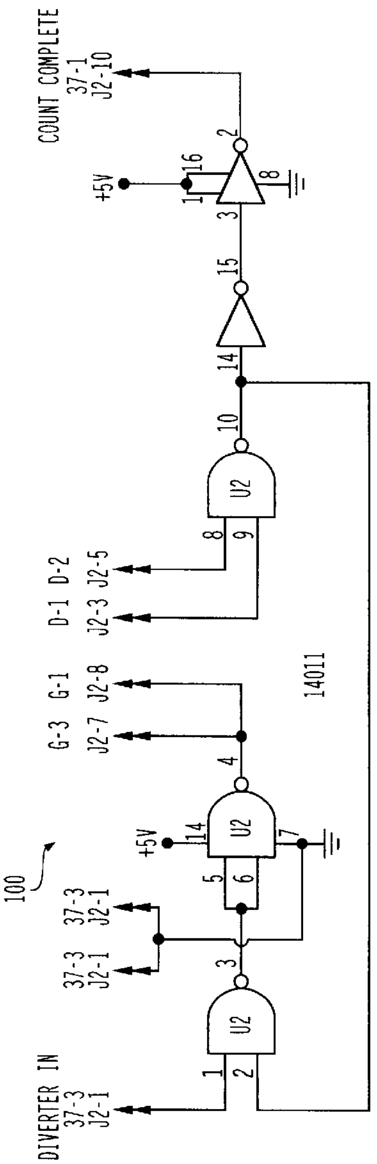
FIG. 8A is an electrical schematic diagram of a timer interrupt circuit in one embodiment of the flow controller in accordance with the present invention.
Figure 8B:
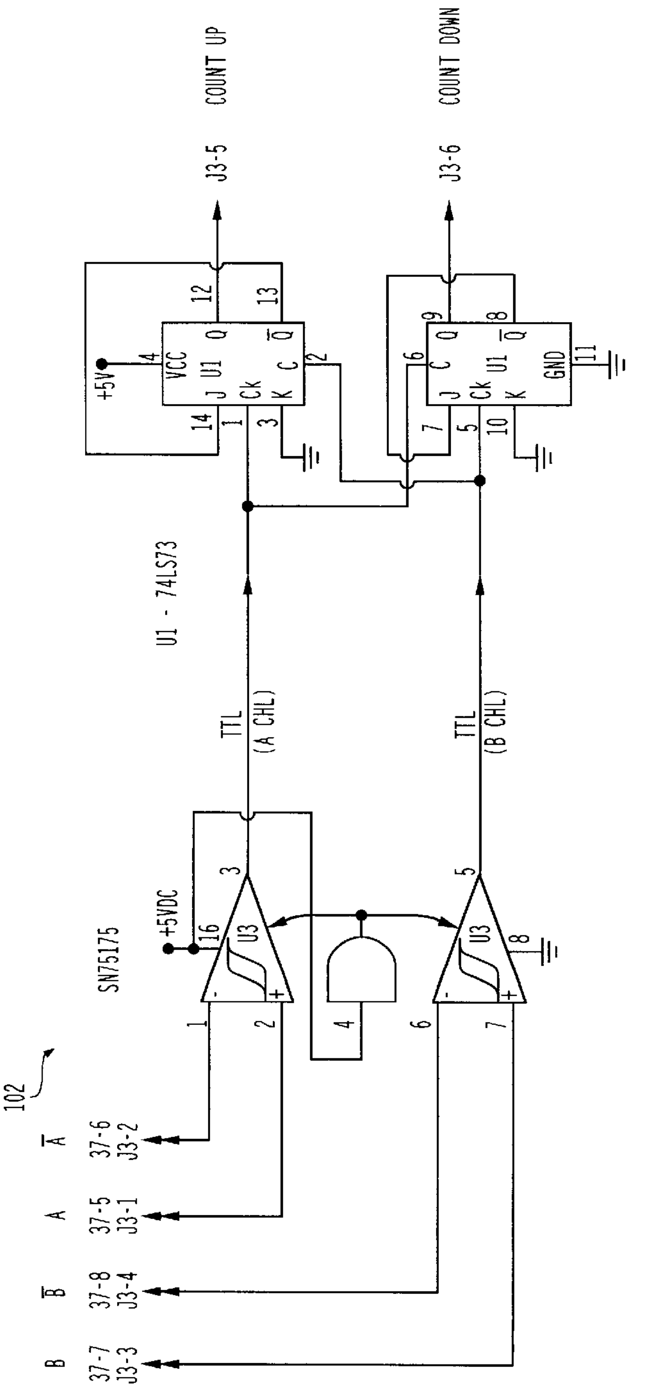
FIG. 8B is an electrical schematic diagram of an encoder conditioning filter circuit in one embodiment of the flow controller in accordance with the present invention.

The encoder pulses from the position sensor 16 are conditioned by the encoder conditioning filter circuit 104 shown in FIG. 8B. The encoder conditioning filter circuit 104 utilizes discrete logic components U1 and U3 to produce a count up or count down output signal. This output signal is gated through U2 of the timer interrupt circuit 100 (FIG. 8A) by the "Diverter In" signal. The count up or count down output signal counts down a preset counter on the Counter/Timer Board 67 which is physically located inside the Digital Computer 63. When the predetermined number of counts (representing the number of shots to be collected and the delay time) have been received, a "Count Complete" signal is sent from U2 of the timer interrupt circuit 100 to CR6 and CR5-A (Count Complete) via a high speed opto-isolation channel 11 of the PB-16C4T on the flow controller circuit 75 as shown in FIGS. 5A and 5B. The CR6 (Count Complete) opens the circuit to drop signals to SV07 (Diverter Valve), CR7 (Diverted) and Q1 (Diverter In) thereby causing the diverter valve SV07 to revert back to its normal position to fuel drain 13 and to stop the filling of the fuel measuring device 9 thereby terminating the measurement event.

Figure 9:
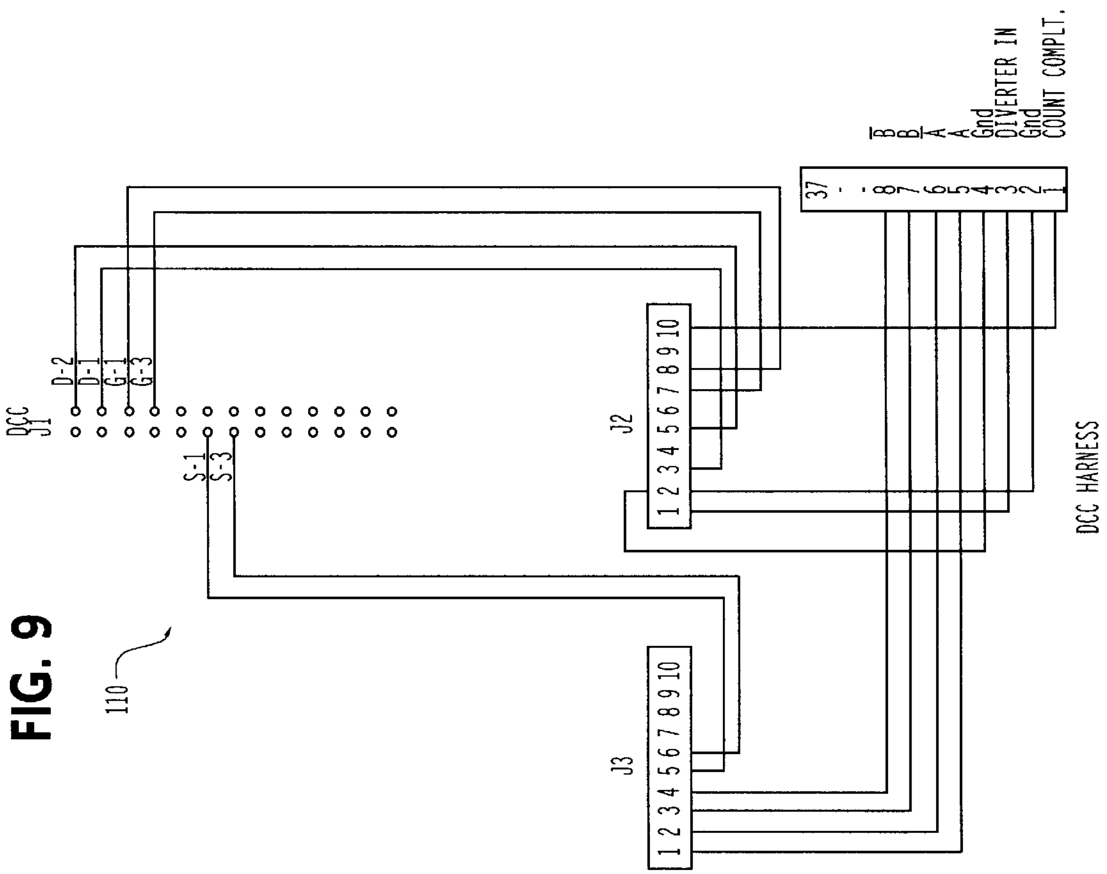
FIG. 9 is an electrical schematic diagram of a wiring harness which can be used to electrically connect the Timer Interrupt Board of FIG. 8C with a Timer/Counter Board of the present invention.
Figure 8C:
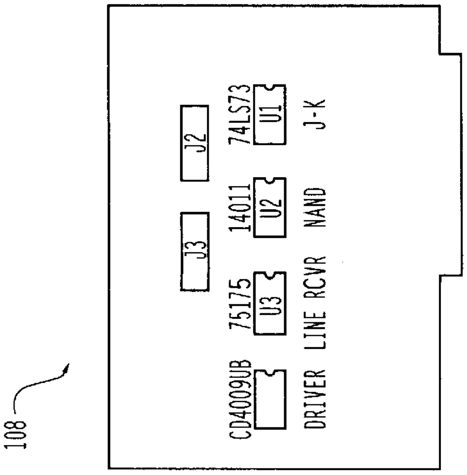
FIG. 8C is a board layout diagram of a Timer Interrupt Board which includes the timer interrupt circuit and the encoder conditioning filter circuit shown in FIG. 8A and FIG. 8B respectively.

FIG. 8C is a board layout diagram of a Timer Interrupt Board 108 showing the general layout of the discrete logic components of the timer interrupt circuit 100 and the encoder conditioning filter circuit 104 shown in FIG. 8A and FIG. 8B. Again, the layout is shown as an example only and alternative layouts may be used in accordance to conventional practices of circuit design. FIG. 9 is an electrical schematic diagram of a harness which can be used to electrically connect the Timer Interrupt Board 108 of the present invention as shown in FIG. 8C with a Counter/Timer Board 67.

After the termination of the measurement event and a short fuel stabilization time, the software program 65 takes a reading using the transducer 21 which measures the pressure differential Delta P. This value is compared to a look up table in the digital computer 63 by the software program 65 to correlate this value of Delta P to fuel mass. The software program 65 can also subtract out the tare reading measured before the commencement of the measurement event thereby enabling the calculation of the total added fuel in the fuel measuring device 9. The volume of fuel delivered for a standard temperature can also calculated by using the measured temperature value and the known density properties of the fuel. The number of shots to be collected, as programmed into the counter/timer board 67 prior to the measurement event, can be used to calculate the amount of fuel mass added per shot. All these values are calculated and recorded into the digital computer 63 by the software program 65.

As a redundant means to verify the number of shots collected, another counter can be provided in the counter/timer board 67 to count the total number of pulses received from the time Q1 is enabled. By dividing the total number of pulses into the encoder pulses per revolution, the number of shots can be calculated and compared to the programmed value. If discrepancy between the values is found, the measurement system 1 can cancel out this measurement run and inform the system user 66.

From the foregoing, it should now be apparent how the present invention provides an improved mass flow measurement system that can accurately measure the fluid provided to each cylinder of a multi-cylinder internal combustion engine and allow precise control over the timing of the measurement so as to synchronize the data acquisition with the pump output thereby ensure measurement accuracy and certainty.

It should also be apparent how the present invention overcomes the timing inconsistencies of the prior art software controlled fuel measurement systems by providing a hardware controlled mass flow measurement system that includes a flow controller with discrete logic components that provide consistent timing control of a fuel routing device.

Furthermore, it can be seen how the present invention provides a mass flow measurement system which ensures that all of the fuel delivered by the designated injector pump or fuel injector during a predetermined number of shots is captured and recorded.

Industrial Applicability

The above discussed mass flow measurement system may be adapted to any environment wherein it is desired to obtain precise measurements of a particular injector or a pump in a device with a plurality of injectors or pumps. Thus, the present invention will be particularly useful in, although not limited to, measuring the fuel provided to each cylinder of a multi-cylinder internal combustion engine.

We claim:

1. A mass flow measurement system for measuring a quantity of fuel delivered by a fuel pump in a fuel system including a plurality of fuel pumps, comprising:

a fuel measuring means for measuring fuel delivered by said fuel pump;

a fuel transfer circuit for directing fuel flow from said plurality of fuel pumps to said fuel measuring means;

a plurality of fuel routing means positioned along said fuel transfer circuit for routing fuel flow from said plurality of fuel pumps into said fuel transfer circuit, each of said plurality of fuel routing means associated with a respective one of the plurality of fuel pumps, and said fuel transfer circuit receiving fuel from said fuel routing means;

a fuel diverting means positioned along said fuel transfer circuit for diverting fuel flow from said plurality of fuel routing means to one of said fuel measuring means and a fuel drain, said fuel diverting means being positioned downstream of said plurality of fuel pumps and upstream of at least one of said fuel measuring means and said fuel drain; and a data acquisition means for controlling said fuel measuring means and said plurality of fuel routing means, said data acquisition means including a digital computer and a hardware based flow controller means for controlling operation of said fuel diverting means independent of said digital computer so that operation of said fuel diverting means is unaffected by timing variations of said digital computer, thereby providing a consistently timed operation of said fuel diverting means.

2. The mass flow measurement system according to claim 1, wherein said plurality of fuel routing means and said fuel diverting means are three-way solenoid valves.

3. The mass flow measurement system according to claim 1, wherein said fuel measuring means includes a transducer and said data acquisition means includes transducer output correlation data for determining quantity of fuel collected.

4. The mass flow measurement system according to claim 1, further including a line pressure transducer positioned in a fuel pump line for providing a trigger signal corresponding to output of a predetermined fuel pump.

5. The mass flow measurement system according to claim 1, wherein said fuel measuring means includes a collection tube of predetermined diameter and length with a first end and a second end, said first end being open to atmospheric pressure and said second end being fixedly mounted to a base.

6. The mass flow measurement system according to claim 5, wherein said base includes a port for connecting a fuel fill line, a port for connecting said transducer and a port for connecting a fuel drain line.

7. The mass flow measurement system according to claim 6, wherein said port for connecting said transducer is fluidically connected to said collection tube by a connector tube.

8. The mass flow measurement system of claim 1, further including a pump position sensor for providing a predetermined number of encoder pulses for one rotation of said fuel pump.

9. The mass flow measurement system of claim 8, further including a counter and timer means for counting said encoder pulses.

10. The mass flow measurement system of claim 9, wherein said counter and timer means also send a switch signal, and terminates said switch signal after counting a predetermined number of encoder pulses.

11. A mass flow measurement system for measuring a quantity of fuel delivered by a fuel pump in a fuel system, comprising:

a fuel measuring means for measuring fuel delivered by said fuel pump;

a fuel transfer circuit for directing fuel flow from said fuel pump to said fuel measuring means;

a fuel routing means positioned along said fuel transfer circuit for routing fuel flow from the fuel pump into said fuel transfer circuit, said fuel transfer circuit receiving fuel from said fuel routing means;

a fuel diverting means positioned along said fuel transfer circuit for diverting fuel flow from said fuel routing means to one of said fuel measuring means and a fuel drain, said fuel diverting means being positioned downstream of said fuel pump and upstream of at least one of said fuel measuring means and said fuel drain; and a data acquisition system including a digital computer and a hardware based flow control means for controlling operation of said fuel diverting means independent of said digital computer so that said fuel diverting means is unaffected by timing variations of said digital computer, thereby providing a consistently timed operation of said fuel diverting means, said digital computer also including a software program for receiving input data, controlling said fuel routing means and obtaining data from said fuel measuring means.

12. The mass flow measurement system according to claim 11, wherein said flow control means includes discrete logic components for controlling said fuel diverting means.

13. The mass flow measurement system according to claim 11, further including a trigger means for providing a trigger signal corresponding to output of said fuel pump.

14. The mass flow measurement system according to claim 13, wherein said trigger means is a line pressure transducer producing an output conditioned by said flow control means.

15. The mass flow measurement system according to claim 13, further including a relay switch, wherein said software program controls said relay switch to electrically connect said trigger means to said flow control means.

16. The mass flow measurement system according to claim 4, further including a pump position sensor for providing a predetermined number of encoder pulses for one rotation of said fuel pump.

17. The mass flow measurement system according to claim 16 wherein said quantity of fuel to be measured is delivered by said fuel pump in at least two distinct pump output events.

18. The mass flow measurement system according to claim 17 wherein said number of pump output events are determined by counting said encoder pulses.

19. The mass flow measurement system according to claim 16 wherein said pump position sensor provides 3600 encoder pulses per revolution of said fuel pump.

20. The mass flow measurement system according to claim 16, further including a counter and timer means for counting said encoder pulses, sending a switch signal, and terminating said switch signal after counting a predetermined number of encoder pulses.

21. The mass flow measurement system according to claim 20, wherein said counter and timer means is a counter/timer board.

22. The mass flow measurement system according to claim 20, wherein said flow control means senses said switch signal and controls said fuel diverting means to divert fuel flow to said fuel measuring means.

23. The mass flow measurement system according to claim 20, wherein said flow control means senses termination of said switch signal and controls said fuel diverting means to divert fuel flow to said fuel drain.

24. The mass flow measurement system according to claim 16, wherein operation of said fuel diverting means is delayed for a predetermined time.

25. The mass flow measurement system according to claim 24, wherein said predetermined time is determined by said encoder pulses.

26. A method for measuring a quantity of fuel delivered by a fuel pump in a fuel system including a plurality of fuel pumps, comprising the steps of:

providing a fuel measuring means for measuring fuel delivered by said fuel pump;

providing a fuel transfer circuit for transferring fuel flow from said plurality of fuel pumps to said fuel measuring means;

receiving operator input data through a software program in a digital computer;

routing fuel flow from said plurality of fuel pumps to said fuel transfer circuit so that the fuel is received in said fuel transfer circuit;

diverting fuel flow in said fuel transfer circuit after said routing step to one of said fuel measuring means and a fuel drain;

obtaining signal from said fuel measuring means corresponding to amount of collected fuel through said software program; and providing a hardware based flow control means for controlling said step of diverting fuel flow independent of said digital computer so that said step of diverting fuel flow is unaffected by timing variations of said computer, thereby providing a consistently timed diversion of fuel flow to one of said fuel measuring means and said fuel drain, said hardware based flow control means including discrete logic components.

27. The method according to claim 26, further including the step of providing a trigger signal to said flow control means, said trigger signal corresponding to an output of one of said plurality fuel pumps.

28. The method according to claim 27, further including the step of controlling a relay switch by said software program to provide said trigger signal to said flow control means.

29. The method according to claim 26, further including the step of providing encoder pulses to said flow control means, said encoder pulses corresponding to position of a predetermined fuel pump.

30. The method according to claim 29, further including the step of counting said encoder pulses and sending a switch signal to said flow control means.

31. The method according to claim 30, further including the step of sensing said switch signal and operating said diverting means to divert fuel flow to said fuel measuring means.

32. The method according to claim 30, further including the step of terminating said switch signal at a predetermined count of said encoder pulses.

33. The method according to claim 32, further including the step of sensing termination of said switch signal and operating said diverting means to divert fuel flow to said fuel drain.

34. A mass flow measurement system for measuring a quantity of fuel delivered by a fuel injector in a fuel system including a plurality of fuel injectors, comprising:

a fuel measuring means for measuring fuel delivered by said fuel injector;

a fuel transfer circuit for directing fuel flow from said plurality of fuel injectors to said fuel measuring means;

a plurality of fuel routing means positioned along said fuel transfer circuit for routing fuel flow from said plurality of fuel injectors into said fuel transfer circuit, each of said plurality of fuel routing means associated with a respective one of the plurality of fuel injectors, and said transfer circuit receiving fuel from said fuel routing means;

a fuel diverting means positioned along said fuel transfer circuit for diverting fuel flow from said plurality of fuel routing means to one of said fuel measuring means and a fuel drain, said fuel diverting means being positioned downstream of said plurality of fuel injectors and upstream of at least one of said fuel measuring means and said fuel drain; and a data acquisition system including a digital computer and a hardware based flow control means for controlling operation of said fuel diverting means independent of said digital computer so that operation of said fuel diverting means is unaffected by timing variations of said digital computer, thereby providing a consistently timed operation of said fuel diverting means, said digital computer including a software program for receiving input data, controlling said fuel routing means and obtaining data from said fuel measuring means.

35. The mass flow measurement system according to claim 34, wherein said plurality of fuel routing means and said fuel diverting means are three-way solenoid valves.

36. The mass flow measurement system according to claim 34, wherein said fuel measuring means includes a transducer and said data acquisition system includes transducer output correlation data for determining quantity of fuel collected.

37. The mass flow measurement system according to claim 34, wherein said fuel measuring means includes a collection tube of predetermined diameter and length with a first end and a second end, said first end being open to atmospheric pressure and said second end being fixedly mounted to a base.

38. The mass flow measurement system according to claim 37, wherein said base includes a port for connecting a fuel fill line, a port for connecting a transducer and a port for connecting a fuel drain line.

39. The mass flow measurement system according to claim 38, wherein said port for connecting said transducer is fluidically connected to said collection tube by a connector tube.

40. The mass flow measurement system according to claim 34, further including a trigger means for providing a trigger signal corresponding to output of a predetermined fuel injector.

41. The mass flow measurement system according to claim 40, wherein said trigger means is a pressure transducer producing an output conditioned by a said flow control means.

42. The mass flow measurement system according to claim 40, further including a relay switch, wherein said software program controls said relay switch to electrically connect said trigger means to said flow control means.

43. The mass flow measurement system according to claim 28, further including a pump position sensor for providing a predetermined number of encoder pulses for one rotation of a fuel pump.

44. The mass flow measurement system according to claim 43, wherein said pump position sensor provides 3600 encoder pulses per revolution of said fuel pump.

45. The mass flow measurement system according to claim 43, further including a counter and timer means for counting said encoder pulses.

46. The mass flow measurement system according to claim 45 wherein said counter and timer means sends a switch signal and terminates said switch signal after counting a predetermined number of encoder pulses.

47. The mass flow measurement system according to claim 46, wherein said counter and timer means is a counter/timer board.

48. The mass flow measurement system according to claim 46, wherein said flow control means senses said switch signal and controls said fuel diverting means to divert fuel flow to said fuel measuring means.

49. The mass flow measurement system according to claim 46, wherein said flow control means senses termination of said switch signal and controls said fuel diverting means to divert fuel flow to said fuel drain.

50. The mass flow measurement system according to claim 34, wherein quantity of fuel to be measured is delivered by said fuel injector in at least two distinct injection events.

51. The mass flow measurement system according to claim 50, wherein said number of injection events are determined by counting said encoder pulses.

52. The mass flow measurement system according to claim 34, wherein operation of said fuel diverting means is delayed for a predetermined time.

53. The mass flow measurement system according to claim 52, wherein said predetermined time is determined by pulses from said pump position sensor.

54. The mass flow measurement system according to claim 34, wherein said flow control means includes discrete logic components for controlling said fuel diverting means.

55. The mass flow measurement system according to claim 54, wherein said flow control means includes a flow controller circuit, a pressure comparison circuit, a pulse stretching circuit, a timer interrupt circuit, and an encoder conditioning filter circuit.

56. A mass flow measurement system for measuring a quantity of fuel delivered by a fuel pump in a fuel system, comprising:

a fuel measuring device adapted to measure fuel delivered by said fuel pump;

a fuel transfer circuit for directing fuel flow from said fuel pump to said fuel measuring device;

a fuel routing device positioned along said fuel transfer circuit to route fuel flow from the fuel pump into said fuel transfer circuit, said fuel transfer circuit receiving fuel from said fuel routing device;

a fuel diverter positioned along said fuel transfer circuit that diverts fuel flow from said fuel routing device to one of said fuel measuring device and a fuel drain, said fuel diverter being positioned downstream of the fuel pump and upstream of at least one of said fuel measuring device and said fuel drain; and a data acquisition system that controls said fuel measuring device and said fuel routing device, said data acquisition system including a digital computer and a hardware based flow controller for controlling operation of said fuel diverter independent of said computer so that operation of said fuel diverter is unaffected by timing variations of said digital computer, thereby providing a consistently timed operation of said fuel diverter.

57. The mass flow measurement system according to claim 56, wherein said data acquisition system includes a digital computer with a software program that receives input data, controls said fuel routing device and obtains data from said fuel measuring device.

58. The mass flow measurement system according to claim 56, wherein said flow controller includes discrete logic components adapted to control said fuel diverter.

59. The mass flow measurement system according to claim 56, further including a trigger for providing a trigger signal corresponding to output of said fuel pump.

60. The mass flow measurement system according to claim 59, wherein said trigger is a line pressure transducer producing an output conditioned by said flow controller.

61. The mass flow measurement system according to claim 59, further including a relay switch, wherein said data acquisition system controls said relay switch to electrically connect said trigger to said flow controller.

62. The mass flow measurement system according to claim 56, further including a pump position sensor for providing a predetermined number of encoder pulses for one rotation of said fuel pump.

63. The mass flow measurement system according to claim 62, wherein said quantity of fuel to be measured is delivered by said fuel pump in at least two distinct pump output events.

64. The mass flow measurement system according to claim 63, wherein said number of pump output events are determined by counting said encoder pulses.

65. The mass flow measurement system according to claim 62, further including a counter/timer that counts said encoder pulses.

66. The mass flow measurement system according to claim 65, wherein said counter/timer also sends a switch signal, and terminates said switch signal after counting a predetermined number of encoder pulses.

67. The mass flow measurement system according to claim 66, wherein said flow controller is adapted to sense said switch signal and to control said fuel diverter to divert fuel flow to said fuel measuring device.

68. The mass flow measurement system according to claim 66, wherein said flow controller senses termination of said switch signal and controls said fuel diverter to divert fuel flow to said fuel drain.

69. The mass flow measurement system according to claim 63, wherein operation of said fuel diverter is delayed for a predetermined time.

70. The mass flow measurement system according to claim 56, wherein said fuel routing device and said fuel diverter are three-way solenoid valves.

71. The mass flow measurement system according to claim 56, wherein said fuel measuring device includes a transducer and said data acquisition system includes transducer output correlation data for determining quantity of fuel collected.

* * * * *